US012720567B2

(12) United States Patent
Xu et al.

(10) Patent No.: US 12,720,567 B2
(45) Date of Patent: Aug. 25, 2026

(54) TWO-STAGE DCI MULTIPLEXING IN PDSCH

(71) Applicant: QUALCOMM Incorporated, San Diego, CA (US)

(72) Inventors: Huilin Xu, Temecula, CA (US); Jing Sun, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 18/500,038

(22) Filed: Nov. 1, 2023

(65) Prior Publication Data

US 2025/0142586 A1 May 1, 2025

(51) Int. Cl.
*H04L 12/00* (2006.01)
*H04W 72/044* (2023.01)
*H04W 72/232* (2023.01)

(52) U.S. Cl.
CPC ....... *H04W 72/232* (2023.01); *H04W 72/044* (2013.01)

(58) Field of Classification Search
CPC .............. H04W 72/332; H04W 72/044; H04L 5/0044; H04L 5/0094; H04L 5/0053
USPC .................................................. 370/329, 330
See application file for complete search history.

(56) References Cited

U.S. PATENT DOCUMENTS 11,357,021 B2 * 6/2022 Kim ...................... H04L 5/0094
11,395,319 B2 * 7/2022 Muruganathan ...... H04W 72/51
2020/0008225 A1 * 1/2020 Lee ....................... H04L 5/0091
2020/0015202 A1 * 1/2020 Khoshnevisan ...... H04W 76/27
2020/0213982 A1 * 7/2020 Xiong .................. H04L 5/0053
2021/0243789 A1 * 8/2021 Fan ....................... H04L 1/0025
2021/0345392 A1 * 11/2021 Ma .................... H04W 72/1273
2022/0217723 A1 * 7/2022 Papasakellariou .... H04L 5/0055
2022/0330299 A1 * 10/2022 Jang .......................... H04L 1/08
(Continued)

FOREIGN PATENT DOCUMENTS

WO WO-2021154932 A1 * 8/2021 ............ H04W 72/23
WO 2022133893 A1 6/2022

OTHER PUBLICATIONS

International Search Report and Written Opinion—PCT/US2024/052078—ISA/EPO—Jan. 9, 2025.

*Primary Examiner* — Frantz Coby
(74) *Attorney, Agent, or Firm* — Procopio, Cory, Hargreaves & Savitch

(57) ABSTRACT

Apparatus, methods, and computer program products for wireless communication are provided. An example method may include receiving, from a network node, a first stage downlink control information (DCI) associated with a second stage DCI, where the first stage DCI comprises information regarding a set of time and frequency resources associated with a physical downlink shared channel (PDSCH), and where the second stage DCI includes decoding information associated with the PDSCH. The example method may further include receiving, from the network node based on the information regarding the set of time and frequency resources, a transmission including the second stage DCI and the PDSCH, where the second stage DCI is multiplexed with the PDSCH, and where the second stage DCI is overlapping in time with the PDSCH. The example method may further include decoding the PDSCH based on the second stage DCI.

30 Claims, 12 Drawing Sheets

(56) References Cited

U.S. PATENT DOCUMENTS

2023/0056636 A1* 2/2023 Park .......................... H04L 1/16
2023/0129120 A1* 4/2023 MolavianJazi ....... H04L 1/1896
370/329

* cited by examiner

One Frame (TDD)
10 ms
200
subframe
RB
slot
D D D D D D D D D D D D F U
subcarrier
OFDM symbol
DMRS R
CSI-RS 230
PDCCH CORESET
SSS
PSS
PDSCH
PBCH
REG
12
REs
1 CCE =
6 REGs
SS/PBCH
Block
BWP
BWP
20
RBs
channel
bandwidth
RBs One Frame (TDD)
10 ms
250
subframe
RB
slot
U U U U U U U U U U U U U U
subcarrier
OFDM symbol
SRS
SRS
Comb 0
SRS
Comb 1
DMRS R

280
PUCCH
PUSCH

TWO-STAGE DCI MULTIPLEXING IN PDSCH

TECHNICAL FIELD

The present disclosure relates generally to communication systems, and more particularly, to wireless communication systems with two-stage downlink control information (DCI).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include at least one memory and at least one processor coupled to the at least one memory. Based at least in part on information stored in the at least one memory, the at least one processor, individually or in any combination, is configured to receive, from a network node, a first stage downlink control information (DCI) associated with a second stage DCI, where the first stage DCI includes information regarding a set of time and frequency resources associated with a physical downlink shared channel (PDSCH), and where the second stage DCI includes decoding information associated with the PDSCH. Based at least in part on information stored in the at least one memory, the at least one processor, individually or in any combination, is configured to receive, from the network node based on the information regarding the set of time and frequency resources, a transmission including the second stage DCI and the PDSCH, where the second stage DCI is multiplexed with the PDSCH, and where the second stage DCI is overlapping in time with the PDSCH. Based at least in part on information stored in the at least one memory, the at least one processor, individually or in any combination, is configured to decode the PDSCH based on the second stage DCI.

In another aspect of the disclosure, a method, a computer-readable medium, and an apparatus at a network entity are provided. The apparatus may include at least one memory and at least one processor coupled to the at least one memory. Based at least in part on information stored in the at least one memory, the at least one processor, individually or in any combination, is configured to transmit, for a UE, a first stage DCI associated with a second stage DCI, where the first stage DCI includes information regarding a set of time and frequency resources associated with a PDSCH, and where the second stage DCI includes decoding information associated with the PDSCH. Based at least in part on information stored in the at least one memory, the at least one processor, individually or in any combination, is configured to transmit, for the UE based on the information regarding the set of time and frequency resources, a transmission including the second stage DCI and the PDSCH, where the second stage DCI is multiplexed with the PDSCH, and where the second stage DCI is overlapping in time with the PDSCH.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
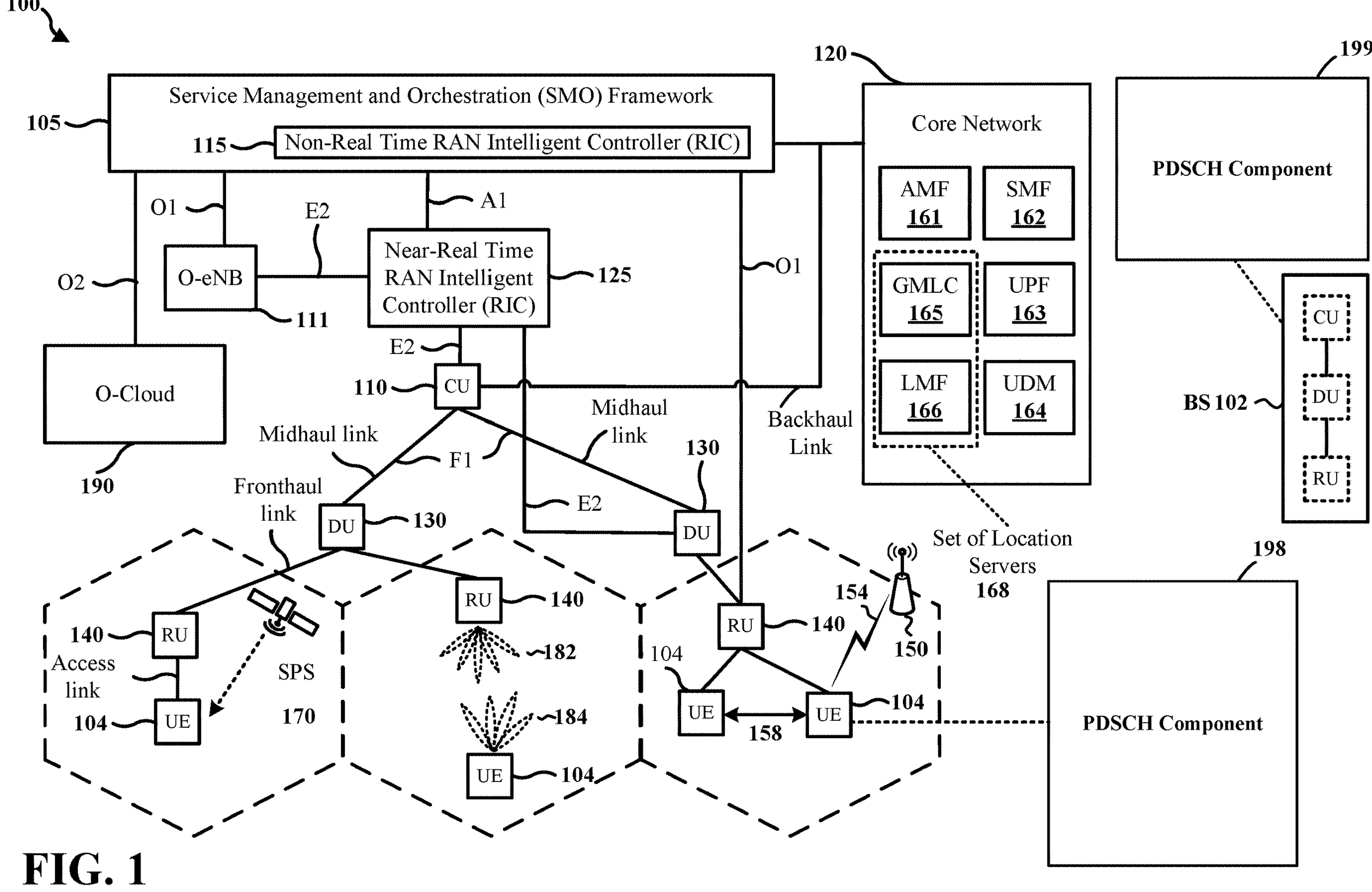
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

A user equipment (UE) may blindly detect and decode a first stage downlink control information (DCI) (e.g., similar to detection of single stage DCI). After the first stage DCI is decoded, the UE may use a small amount of additional UE processing efforts to decode the second stage DCI. For the transmission of the second stage DCI, it may be possible to (1) piggyback the second stage DCI in the scheduled physical downlink shared channel (PDSCH), (2) transmit the second stage DCI in a configured search space (SS) set. Some wireless communication systems support PDSCH rate matching around the scheduling DCI. In some aspects provided herein, the PDSCH may be rate matched around the second stage DCI. For example, to rate match the PDSCH around the second stage DCI, a network node may encode the PDSCH based on a rate matching pattern and may avoid a conflict (e.g., transmitting in a same time and frequency resource) between the second stage DCI and the PDSCH. The second stage DCI may be overlapping in time and may use different frequency domain resources. Interleaved control channel element (CCE) to resource element group (REG) mapping may be used for the second stage DCI, which may provide better frequency diversity than consecutive resource mapping. In some aspects, there may be a standalone SS set for second stage DCI which may be specified as an aggregation level and DCI format may be provided in an SS set configuration associated with the SS set. It may be beneficial to multiplex the second stage DCI and the scheduled PDSCH in the same physical resources so that the second stage DCI and PDSCH are transmitted in the same narrow beam. Multiplexing the second stage DCI and the scheduled PDSCH in the same physical resources may allow easier resource management for multi-UE scheduling by allocating the second-DCI and PDSCH of the same UE in the same symbols and resource block (RB) segment without gap in between.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHZ), FR4 (71 GHz-114.25 GHZ), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a PDSCH component 198. In some aspects, the PDSCH component 198 may be configured to receive, from a network node, a first stage DCI associated with a second stage DCI, where the first stage DCI includes information regarding a set of time and frequency resources associated with a PDSCH, and where the second stage DCI includes decoding information associated with the PDSCH. In some aspects, the PDSCH component 198 may be further configured to receive, from the network node based on the information regarding the set of time and frequency resources, a transmission including the second stage DCI and the PDSCH, where the second stage DCI is multiplexed with the PDSCH, and where the second stage DCI is overlapping in time with the PDSCH. In some aspects, the PDSCH component 198 may be further configured to decode the PDSCH based on the second stage DCI.

In certain aspects, the base station 102 may include a PDSCH component 199. In some aspects, the PDSCH component 199 may be configured to transmit, for a UE, a first stage DCI associated with a second stage DCI, where the first stage DCI includes information regarding a set of time and frequency resources associated with a PDSCH, and where the second stage DCI includes decoding information associated with the PDSCH. In some aspects, the PDSCH component 199 may be further configured to transmit, for the UE based on the information regarding the set of time and frequency resources, a transmission including the second stage DCI and the PDSCH, where the second stage DCI is multiplexed with the PDSCH, and where the second stage DCI is overlapping in time with the PDSCH.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figures 2A, 2B, 2C, 2D:
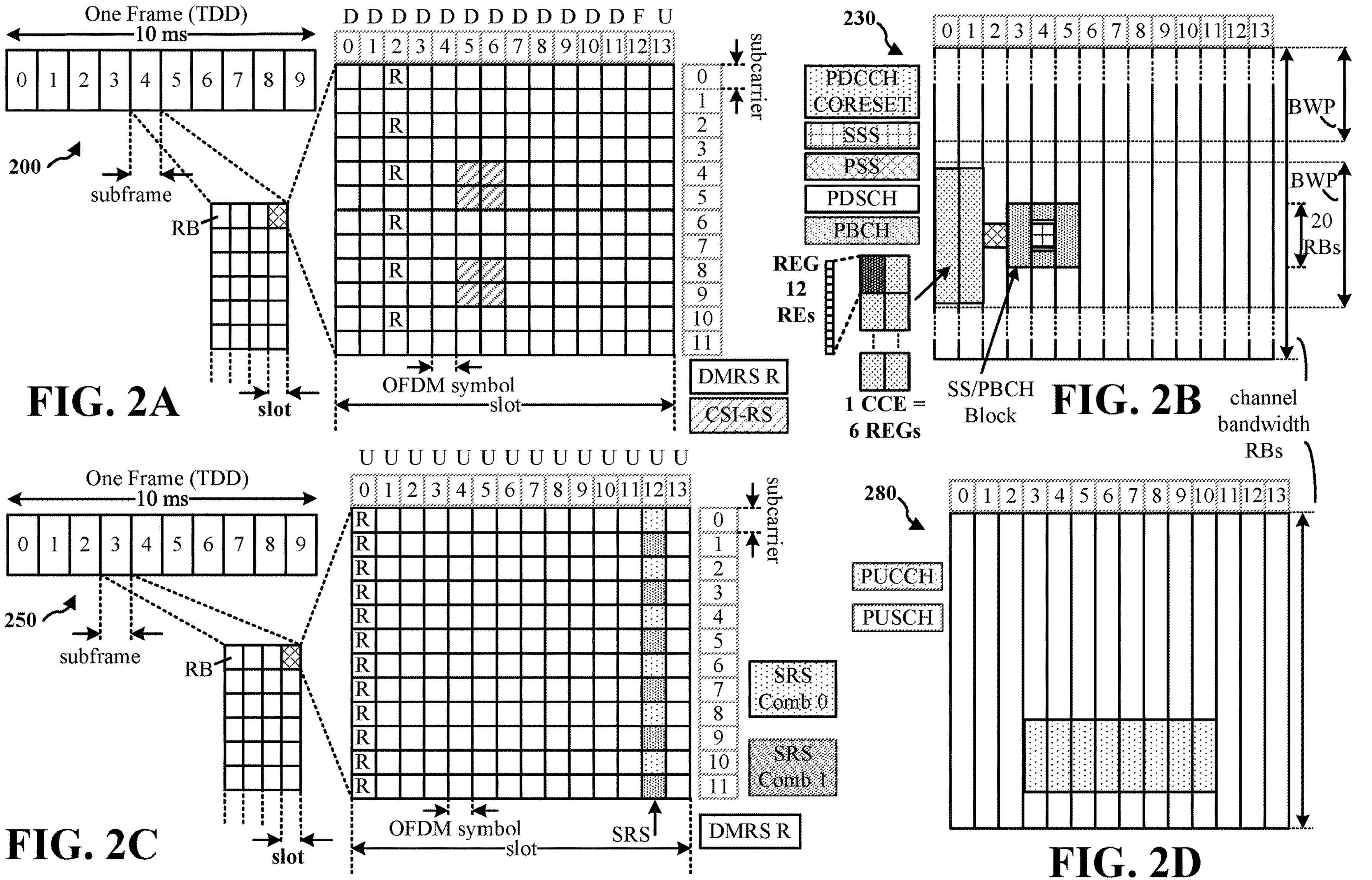
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to, $2^{\mu}*15$ khz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
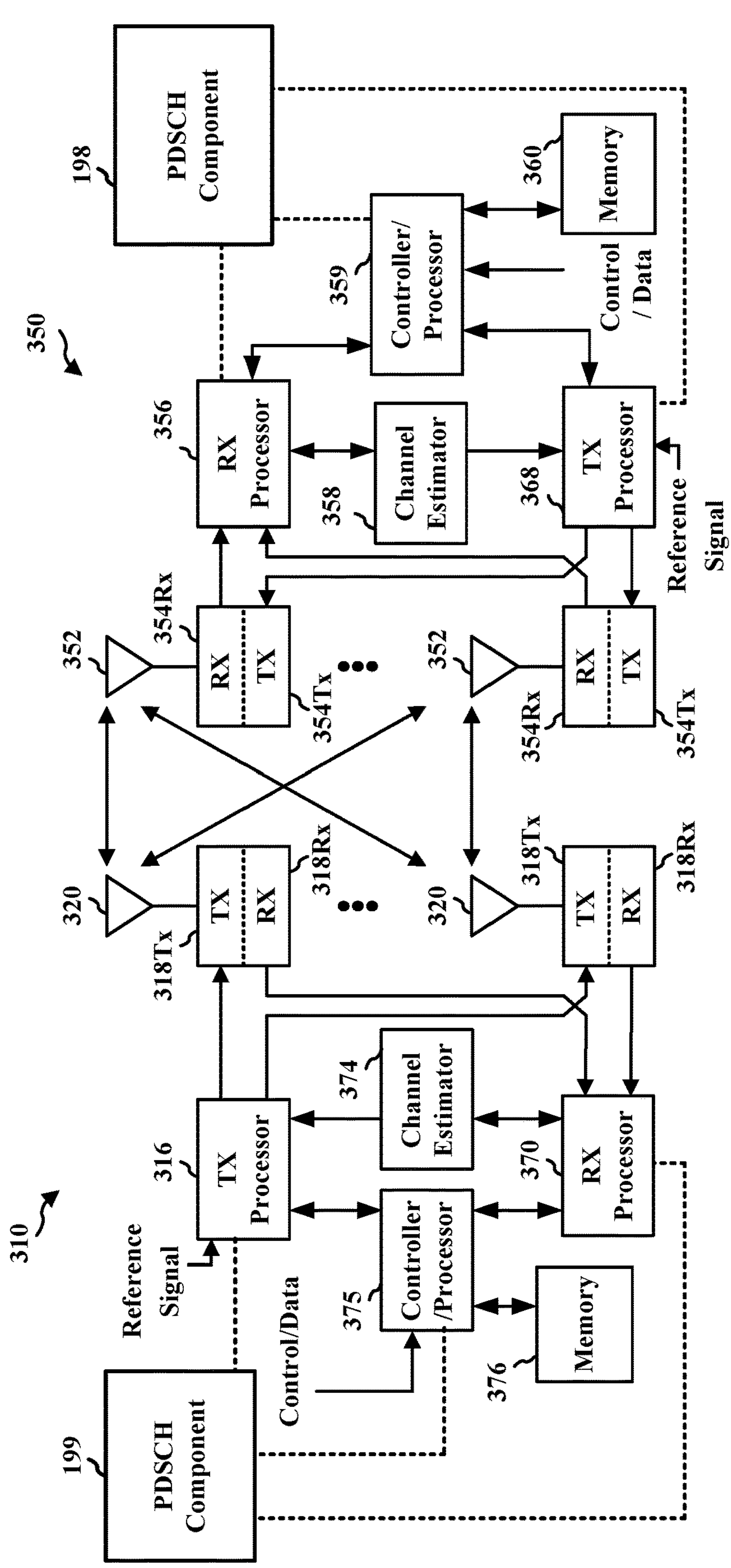
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with PDSCH component 198 of FIG. 1.

At least one of the TX processor 316, the RX processor 370, and the controller/processor 375 may be configured to perform aspects in connection with PDSCH component 199 of FIG. 1.

In some wireless communication systems, two-stage DCI may be used and a first stage DCI and a second stage DCI may jointly provide the full scheduling information for the data channel. A first stage DCI may include demodulation related parameters, such as MIMO related information, antenna information, modulation order, resource allocation, demodulation reference signal (DMRS) configuration, and resource location for the second stage DCI, or the like, for the UE to capture digital samples, perform channel estimation and equalization, or the like. A second stage DCI may include decoding related information for the data channel (PDSCH) such as HARQ process ID, redundancy version identifier (RVID), new data indicator (NDI), code rate, modulation and coding scheme (MCS), power control information, beam information, or the like, for the UE to decode the information content (e.g., in the data channel) and perform HARQ combining. A UE may blindly detect and decode the first stage DCI (e.g., similar to detection of single stage DCI). After the first stage DCI is decoded, the UE may use a small amount of additional UE processing efforts to decode the second stage DCI. For the transmission of the second stage DCI, it may be possible to (1) piggyback the second stage DCI in the scheduled PDSCH, (2) transmit the second stage DCI in a configured search space (SS) set. Some wireless communication systems support PDSCH rate matching around the scheduling DCI. In some aspects provided herein, the PDSCH may be rate matched around the second stage DCI. For example, to rate match the PDSCH around the second stage DCI, a network node may encode the PDSCH based on a rate matching pattern and may avoid a conflict (e.g., transmitting in a same time and frequency resource) between the second stage DCI and the PDSCH.

The second stage DCI may be overlapping with the PDSCH in time and frequency domain resources. Interleaved CCE to resource element group (REG) mapping may be used for the second stage DCI, which may provide better frequency diversity than consecutive resource mapping. In some aspects, there may be a standalone SS set for second stage DCI which may be specified as an aggregation level (which may be the number of CCEs allocated for the second stage DCI) and DCI format may be provided in an SS set configuration associated with the SS set. It may be beneficial to multiplex the second stage DCI and the scheduled PDSCH in the same physical resources so that the second stage DCI and PDSCH are transmitted in the same narrow beam. Multiplexing the second stage DCI and the scheduled PDSCH in the same physical resources may allow easier resource management for multi-UE scheduling by allocating the second-DCI and PDSCH of the same UE in the same symbols and RB segment without gap in between.

For uplink, a UE may start preparing UL data once it receives the first stage DCI (e.g., with less information than a single stage DCI) so that data may be transmitted immediately after the second stage DCI is decoded. In some aspects, DCI size may be aligned (e.g., to be the same or to be in specified increments) among different first stage DCI formats so that blind detection may be less demanding.

Figure 4:
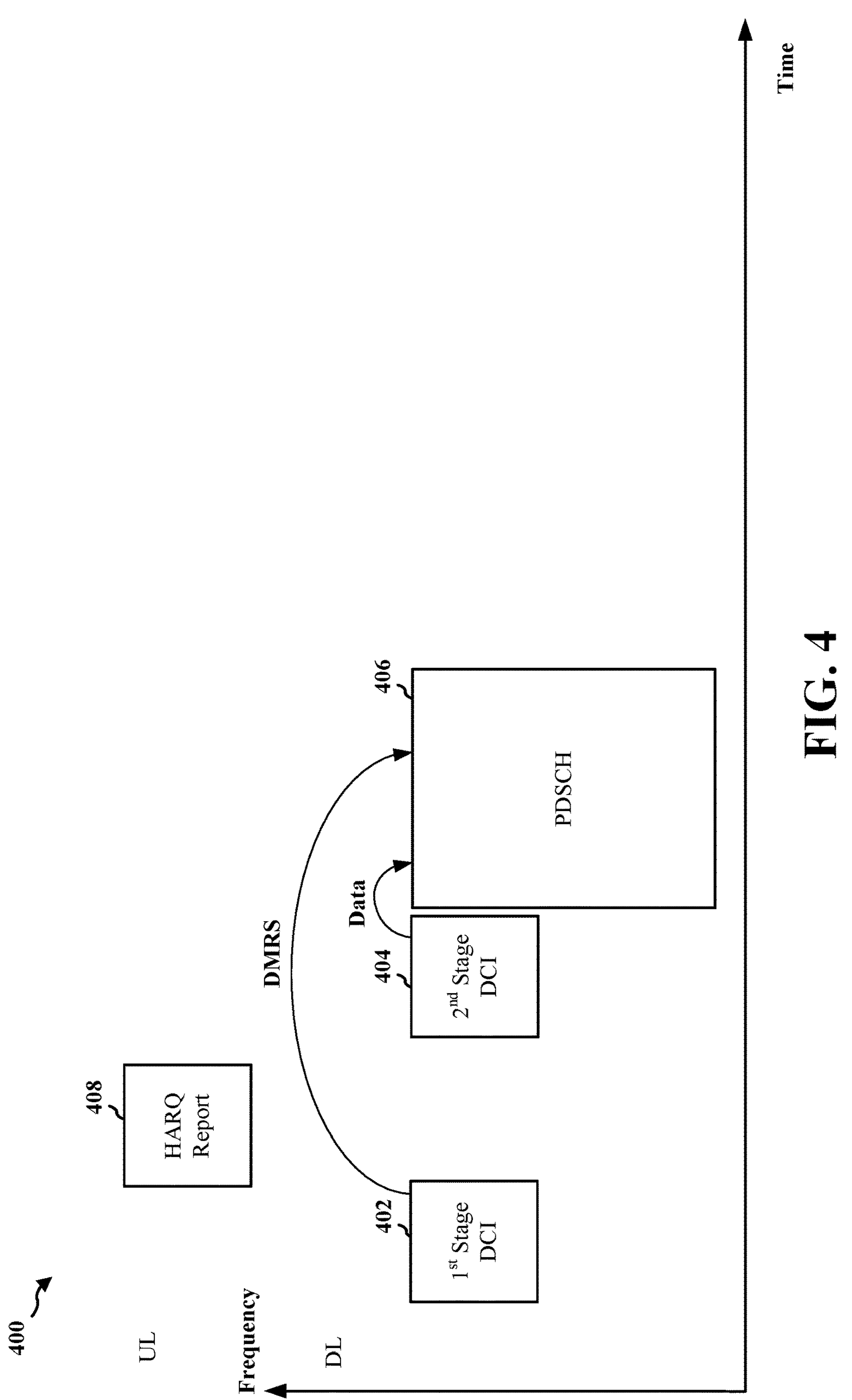
FIG. 4 is a diagram illustrating example two-stage downlink control information (DCI).

FIG. 4 is a diagram 400 illustrating example two-stage DCI. As illustrated in FIG. 4, a first stage DCI 402 may include demodulation related parameters, such as MIMO related information, antenna information, modulation order, resource allocation, DMRS configuration, and resource location for the second stage DCI, or the like, for the UE to capture digital samples, perform channel estimation and equalization, or the like.

A second stage DCI 404 may be associated with the first stage DCI 402 may include decoding related information for the data channel (e.g., PDSCH 406) such as HARQ process ID, RVID, NDI, code rate, MCS, power control information, beam information, or the like, for the UE to decode the information content (e.g., in the data channel) and perform HARQ combining. In the uplink channel, there may be a HARQ report 408. As illustrated in FIG. 4, the network may schedule resources before the HARQ-ACK (e.g., in a HARQ report 408) for a past PDSCH (e.g., received before the first stage DCI 402) so that the UE may start RS processing and channel estimation before the second stage DCI 404 is decoded.

Figure 5:
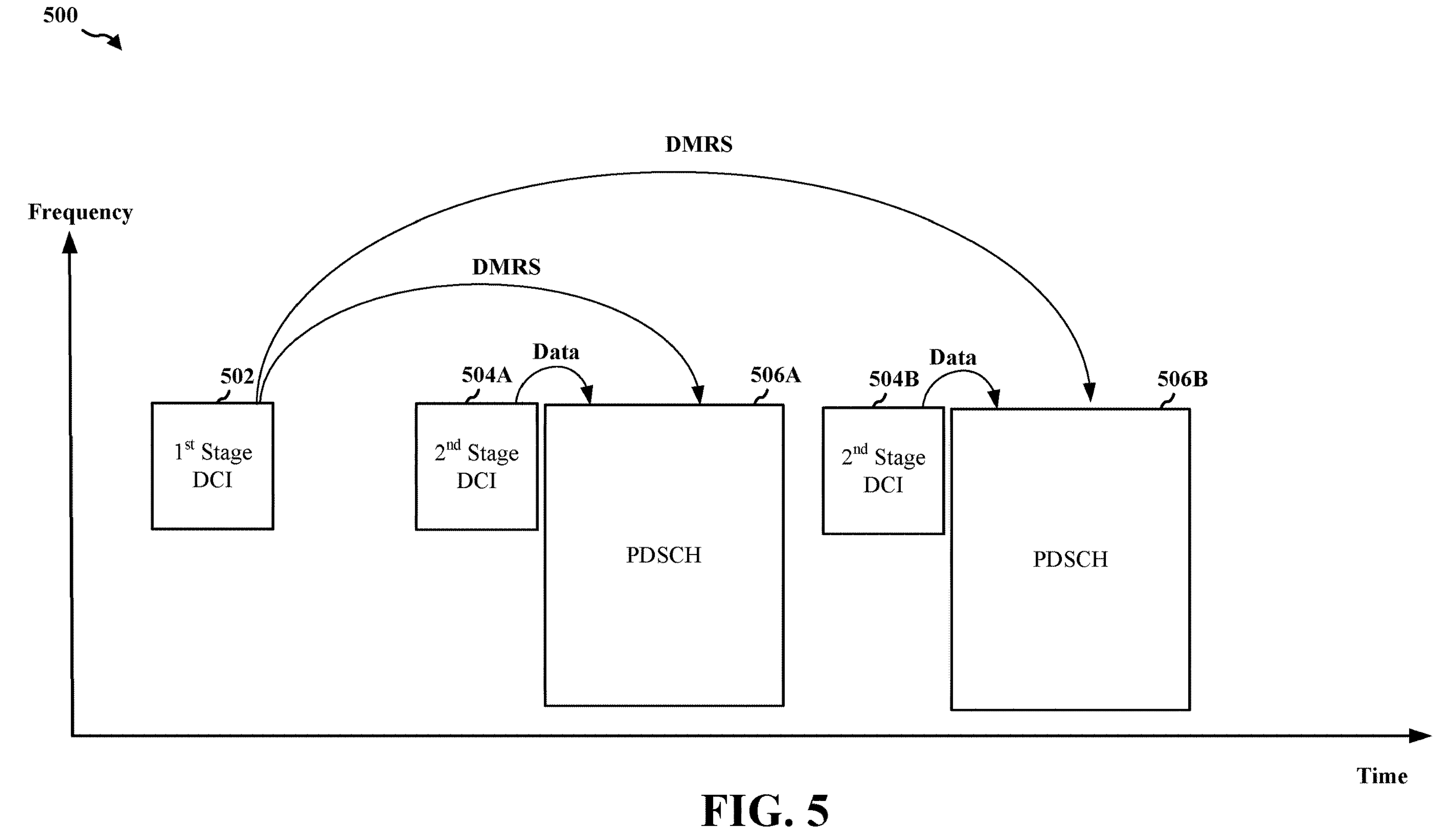
FIG. 5 is a diagram illustrating example two-stage DCI where a single first stage DCI is associated with multiple two-stage DCI.

FIG. 5 is a diagram 500 illustrating example two-stage DCI where a single first stage DCI is associated with multiple second stage DCIs. A single first stage DCI may provide common scheduling information for multiple transmissions and individual second stage DCIs may provide link adaptation scheduling information for different transmissions. As illustrated in FIG. 5, a first stage DCI 502 may include demodulation related parameters, such as MIMO related information, antenna information, modulation order, resource allocation, DMRS configuration, and resource location for the second stage DCI, or the like, for the UE to capture digital samples, perform channel estimation and equalization, or the like.

An initial second stage DCI 504A may be associated with the first stage DCI 502 and may include decoding related information for the data channel (e.g., PDSCH 506A) such as HARQ process ID, RVID, NDI, code rate, MCS, power control information, beam information, or the like, for the UE to decode the information content (e.g., in the data channel) and perform HARQ combining. A subsequent second stage DCI 504B may be associated with the first stage DCI 502 and may include decoding related information for the data channel (e.g., PDSCH 506B) such as HARQ process ID, RVID, NDI, code rate, MCS, power control information, beam information, or the like, for the UE to decode the information content (e.g., in the data channel) and perform HARQ combining. Because multiple second stage DCIs may share a first stage DCI, information in the shared first stage DCI may be transmitted once instead of multiple times, potentially reducing signaling overhead for the control channel.

Figure 6:
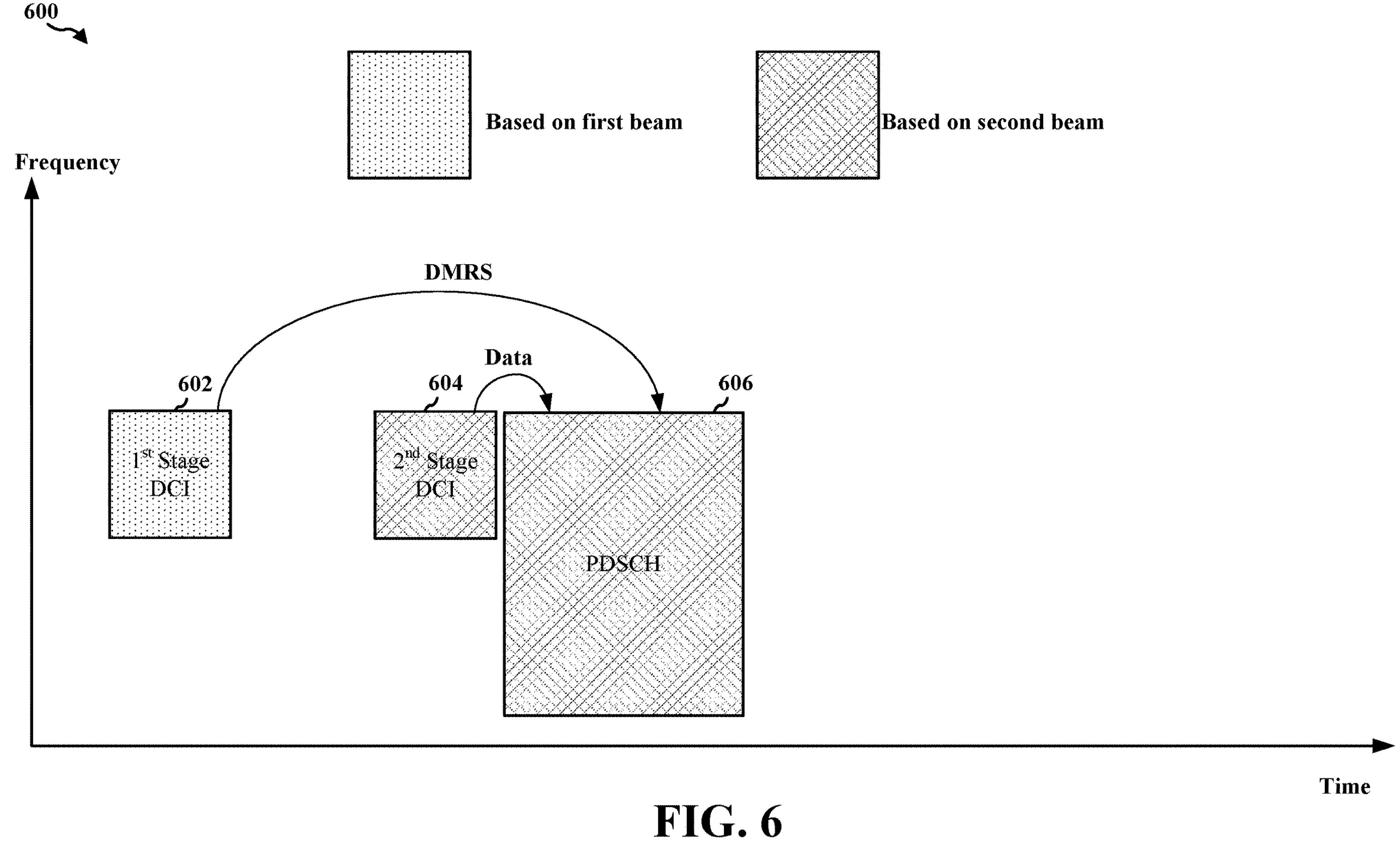
FIG. 6 is a diagram illustrating example two-stage DCI where a first stage DCI is transmitted based on a first beam and an associated second stage DCI is transmitted based on a second beam different from the first beam.

FIG. 6 is a diagram 600 illustrating example two-stage DCI where a first stage DCI is transmitted based on a first beam and an associated second stage DCI is transmitted based on a second beam different from the first beam. The first beam may be a beam wider than the second beam to allow for more spectral efficient transmission of the second stage DCI (e.g., in a narrower beam) while maintaining easier detectability for the first stage DCI.

As illustrated in FIG. 6, a first stage DCI 602 may include demodulation related parameters, such as MIMO related information, antenna information, modulation order, resource allocation, DMRS configuration, and resource location for the second stage DCI, or the like, for the UE to capture digital samples, perform channel estimation and equalization, or the like.

A second stage DCI 604 may be associated with the first stage DCI 602 may include decoding related information for the data channel (e.g., PDSCH 606) such as HARQ process ID, RVID, NDI, code rate, MCS, power control information, beam information, or the like, for the UE to decode the information content (e.g., in the data channel) and perform HARQ combining.

Figures 7A, 7B:
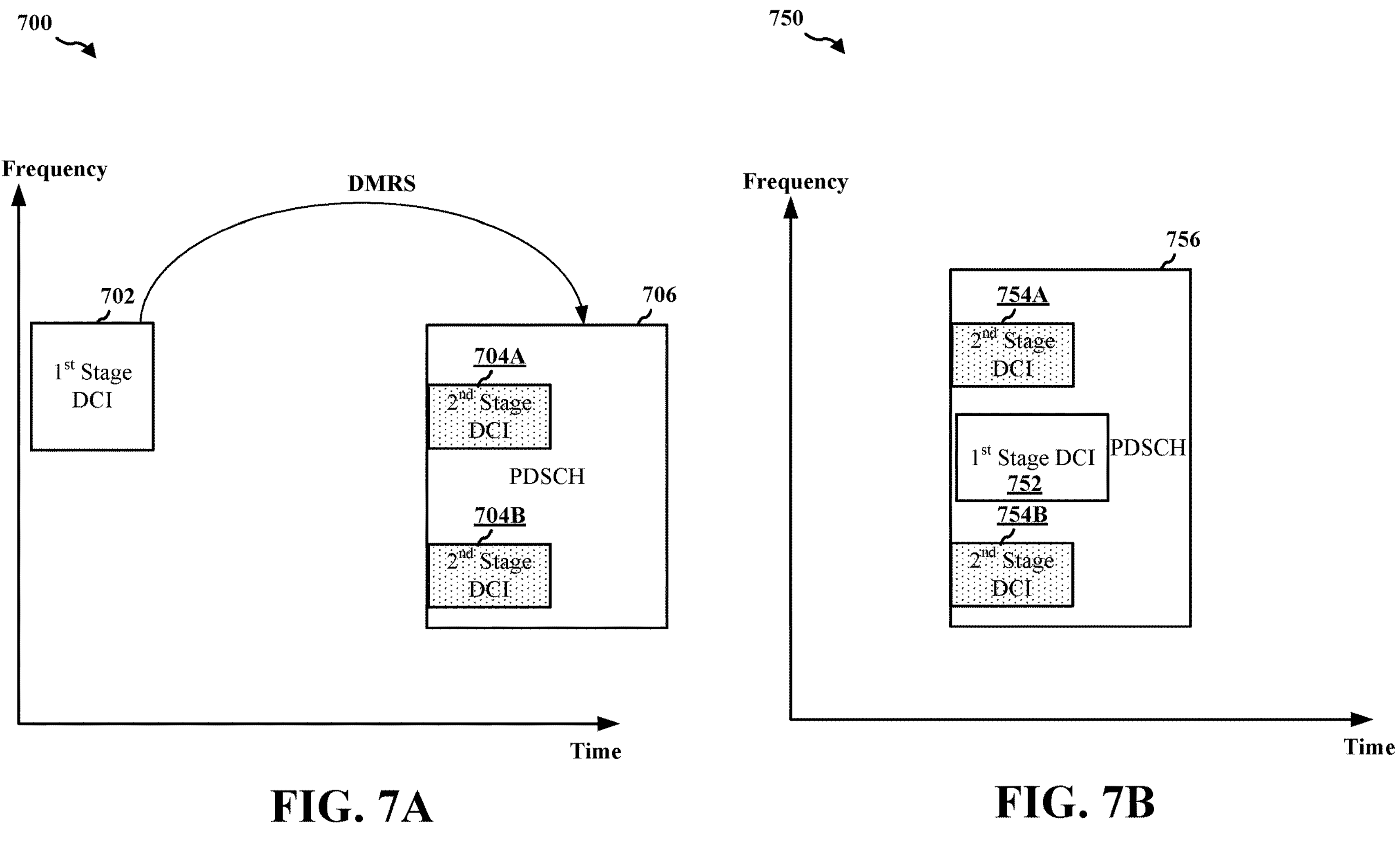
FIG. 7A is a diagram illustrating example two-stage DCI where a first stage DCI is associated with a second stage DCI and PDSCH is rate matched around the second stage DCI.
FIG. 7B is a diagram illustrating example two-stage DCI where a first stage DCI is associated with a second stage DCI and PDSCH is rate matched around the second stage DCI and the first stage DCI.

FIG. 7A is a diagram 700 illustrating example two-stage DCI where a first stage DCI is associated with a second stage DCI and PDSCH is rate matched around the second stage DCI. As illustrated in FIG. 7A, a first stage DCI 702 may include demodulation related parameters, such as MIMO related information, antenna information, modulation order, resource allocation, DMRS configuration, and resource location for the second stage DCI, or the like, for the UE to capture digital samples, perform channel estimation and equalization, or the like. The PDSCH 706 may be rate matched around a first portion of the second stage DCI 704A and a second portion of the second stage DCI 704B. The second stage DCI may be configured with interleaved CCE to REG mapping for the search space set where the DCI is configured (the mapping type may be included in the control resource set associated with the search space set). In some aspects, the first stage DCI 702 allocates resources for the PDSCH 706. The search space set occasion (PDCCH monitoring occasion) for the second stage DCI may fully overlap with the resources for the PDSCH 706. The PDSCH 706 may be filled in the remaining resources after the second stage DCI (e.g., a first portion of the second stage DCI 704A and a second portion of the second stage DCI 704B) is mapped. In some aspects, interleaved CCE to REG mapping may be configured and the second stage DCI may be distributed over non-consecutive resources (e.g., in a first portion of the second stage DCI 704A and a second portion of the second stage DCI 704B). In some aspects, the second stage DCI and the PDSCH 706 may be transmitted with a same power and a same beam.

In some aspects, if the UE supports rate matching around a single stage DCI and if the first stage DCI also overlaps with the scheduled PDSCH, both the first stage DCI and the second stage DCI may be rate matched around the scheduled PDSCH. FIG. 7B is a diagram 750 illustrating example two-stage DCI where a first stage DCI is associated with a second stage DCI and PDSCH is rate matched around the second stage DCI and the first stage DCI.

As illustrated in FIG. 7B, a first stage DCI 752 may include demodulation related parameters, such as MIMO related information, antenna information, modulation order, resource allocation, DMRS configuration, and resource location for the second stage DCI, or the like, for the UE to capture digital samples, perform channel estimation and equalization, or the like. The PDSCH 756 may be rate matched around a first portion of the second stage DCI 754A and a second portion of the second stage DCI 754B, and the first stage DCI 752.

In some aspects, the search space set occasion (PDCCH monitoring occasion) for the second stage DCI and the first stage DCI may overlap with the resources for the PDSCH 756. The PDSCH 756 may be filled in the remaining resources after the second stage DCI (e.g., a first portion of the second stage DCI 754A and a second portion of the second stage DCI 754B) and the first stage DCI 752 are mapped. In some aspects, interleaved CCE to REG mapping may be configured and the second stage DCI may be distributed over non-consecutive resources (e.g., in a first portion of the second stage DCI 754A and a second portion of the second stage DCI 754B). In some aspects, the second stage DCI, the first stage DCI 752, and the PDSCH 756 may be transmitted with a same power and a same beam.

Figure 8:
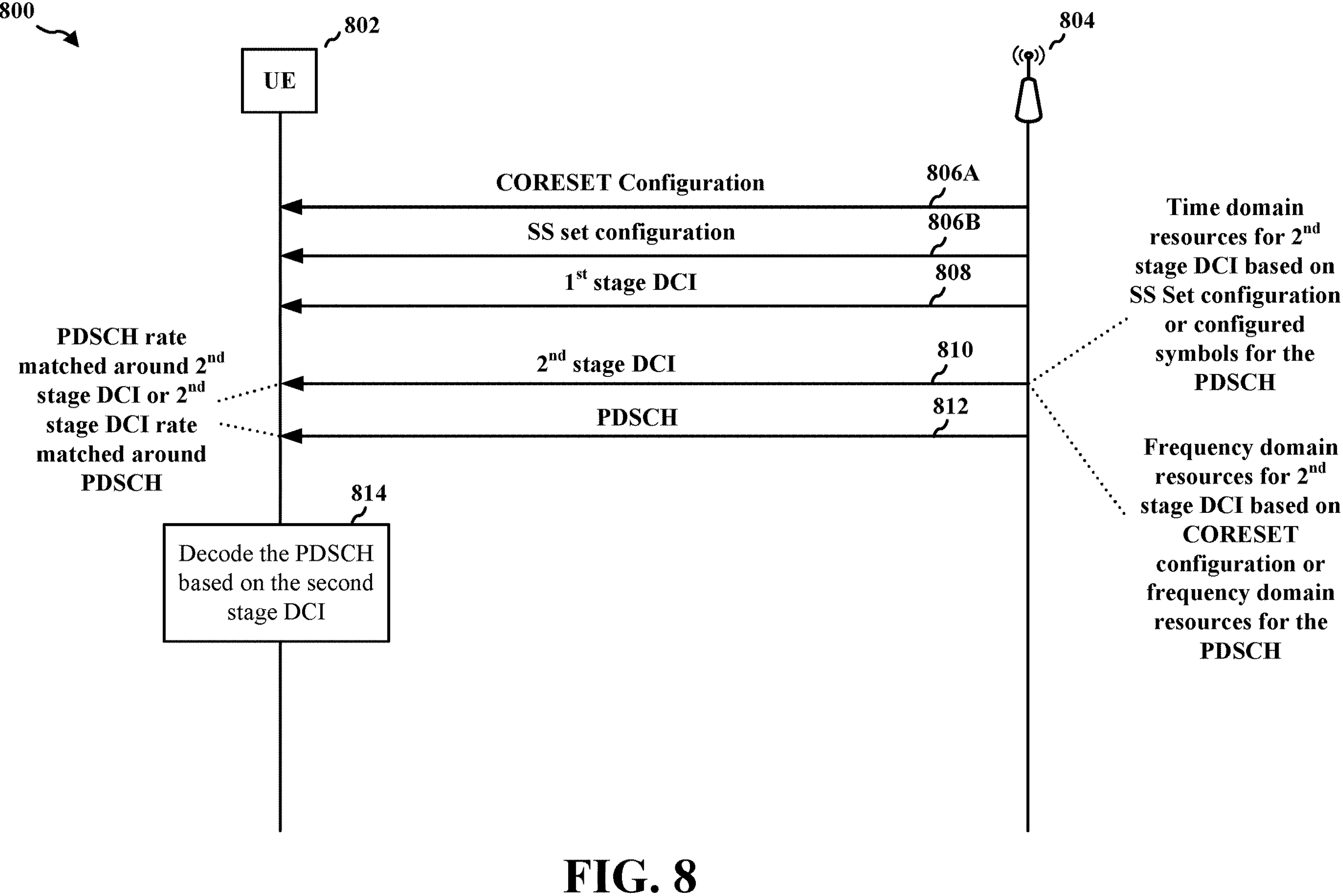
FIG. 8 is a diagram illustrating example communications between a network node and a UE.

FIG. 8 is a diagram 800 illustrating example communications between a network node 804 and a UE 802. As illustrated in FIG. 8, the network node 804 may transmit a control resource set (CORESET) configuration 806A and a SS set configuration 806B to the UE 802. The network node 804 may also transmit a first stage DCI 808 to the UE 802. The first stage DCI 808 may include demodulation related parameters, such as MIMO related information, antenna information, modulation order, resource allocation, DMRS configuration, and resource location for the second stage DCI, or the like, for the UE to capture digital samples, perform channel estimation and equalization, or the like. The network node 804 may also transmit a second stage DCI 810, which may be associated with the first stage DCI 808 and may include decoding related information for the data channel (e.g., PDSCH 812) such as HARQ process ID, RVID, NDI, code rate, MCS, power control information, beam information, or the like, for the UE 802 to decode the information content (e.g., in the data channel) and perform HARQ combining. In some aspects, the PDSCH 812 may be rate matched around the second stage DCI 810 (e.g., as illustrated in FIG. 7A). In some aspects, the PDSCH 812 may be rate matched around the second stage DCI 810 and the first stage DCI 808 (e.g., as illustrated in FIG. 7B).

In some aspects, frequency domain resource allocation for the second stage DCI 810 may be compatible with the frequency domain resource allocation (FDRA) for the PDSCH 812. In some aspects, to be compatible, the second stage DCI 810 may be fully contained by the FDRA of the scheduled PDSCH 812.

In some aspects, a range of frequency domain resources for the second stage DCI 810 may be determined by explicit configuration in the CORESET (e.g., in 806A) for the second stage DCI 810. For example, frequency domain resources for CORESET may indicated by a bitmap, each bit indicates whether a set of a quantity (e.g., six) of consecutive RBs may be used. In some aspects, the configuration (e.g., in 806A) may be compatible with frequency domain resource allocation for the scheduled PDSCH, by being either same as or within the PDSCH frequency resources. In some aspects, a range of frequency domain resources for the second stage DCI 810 may be determined by frequency domain resources for the PDSCH 812. In some aspects, frequency domain resources allocated to PDSCH 812 (e.g., start RB and size for each segment of consecutive RBs in the FDRA) may be further quantized in RB granularity of a quantity (e.g., six).

In some aspects, time domain resource allocation for the second stage DCI 810 may also be compatible with the PDSCH 812. For example, in some aspects, symbols of the second stage DCI 810 may be contained by the time domain resource allocation (TDRA) of the scheduled PDSCH 812. In some aspects, the time domain resources for the second stage DCI 810 are determined by an explicit configuration by the search space set (e.g., 806B) for the second stage DCI (e.g., 810). In some aspects, search space occasions for the second stage DCI may or may not align (e.g., one and solely one search space occasion is fully contained by symbols allocated for the scheduled PDSCH) with scheduled PDSCHs. In some aspects, the first search space set occasion that is fully contained by symbols for the PDSCH 812 may be used for the second stage DCI 810.

In some aspects, the time domain resources for the second stage DCI 810 are determined by configured symbols of the PDSCH 812. In some aspects, the search space configuration (e.g., 806B) for the second stage DCI 810 may provide a quantity of symbols, and a start of the search space set occasion may be aligned with PDSCH starting symbol (e.g., or a different symbol). For example, a floating start of the second stage DCI search space occasion, number of symbols for second stage DCI may be a minimum of a configured number of symbols for the second stage DCI 810 or the number of symbols for the PDSCH 812.

In some aspects, the second stage DCI 810 is multiplexed with PDSCH 812. In some aspects, some of the allocated PDSCH resources are not available for PDSCH transmission if these resources belong to PDSCH rate matching resources including SSBs, RB-symbol level rate matching resources and RE level rate matching resources (such as CSI-RS or other RS). In some aspects, the network node 804 may not use a PDCCH candidate for second stage DCI transmission if it overlaps with PDSCH rate matching resources (e.g., the entire PDCCH candidate may be skipped if any part of it belongs to PDSCH rate matching resources). As used herein, the term "PDSCH rate matching resources" may refer to SSBs, RB-symbol level rate matching resources and RE level rate matching resources (such as CSI-RS or another RS).

In some aspects, if a monitoring occasion for second stage DCI 810 overlaps with resources allocated for a PDSCH, the second stage DCI 810 is not transmitted in any PDCCH candidate of the second stage DCI that overlaps with rate matching resources (except for the second stage DCI itself as a rate matching resource) for the PDSCH 812.

In some aspects, to map the second stage DCI PDCCH candidates to resources, the PDSCH rate matching resources may be removed first. In some aspects, if the monitoring occasion for the second stage DCI 810 overlaps with resources allocated for a PDSCH, the network node 804 may remove resource that belong to PDSCH rate matching resources, then map PDCCH candidates of the second stage DCI 810 to the remaining resources. In some aspects, the remaining resources, including start RB and size for each segment of consecutive RBs may be further quantized in a particular RB granularity (e.g., six).

In some aspects, at 814, the UE 802 may decode the PDSCH 812 based on the second stage DCI 810. In some aspects, PDCCH decoding efforts may be minimized for the second stage DCI 810 if the second stage DCI 810 is transmitted on a fixed PDCCH candidate in the second stage DCI monitoring occasion. In some aspects, the entire chunk of resources used by second stage DCI 810 and the PDSCH 812 may be treated as if they are all user data and there may be no further randomization of resource allocation for the second stage DCI in addition to interleaved CCE to REG mapping and slot dependent CCE offset configured for the CORESET. In some aspects, if multiple PDCCH candidates per aggregation level are configured in the second stage DCI search space set (e.g., configured by 806A), the second stage DCI 810 is transmitted in the first PDCCH candidate that is available for second stage DCI transmission. In some aspects, a PDCCH candidate colliding with PDSCH rate matching resources may not be available for second stage DCI transmission (additional conditions that second stage DCI is not transmitted on certain PDCCH candidate is not precluded). The network node 804 may configure multiple PDCCH candidates (even if no more than one is used) so that at least one of the PDCCH candidates may not collide with the PDSCH rate matching resources.

Figure 9:
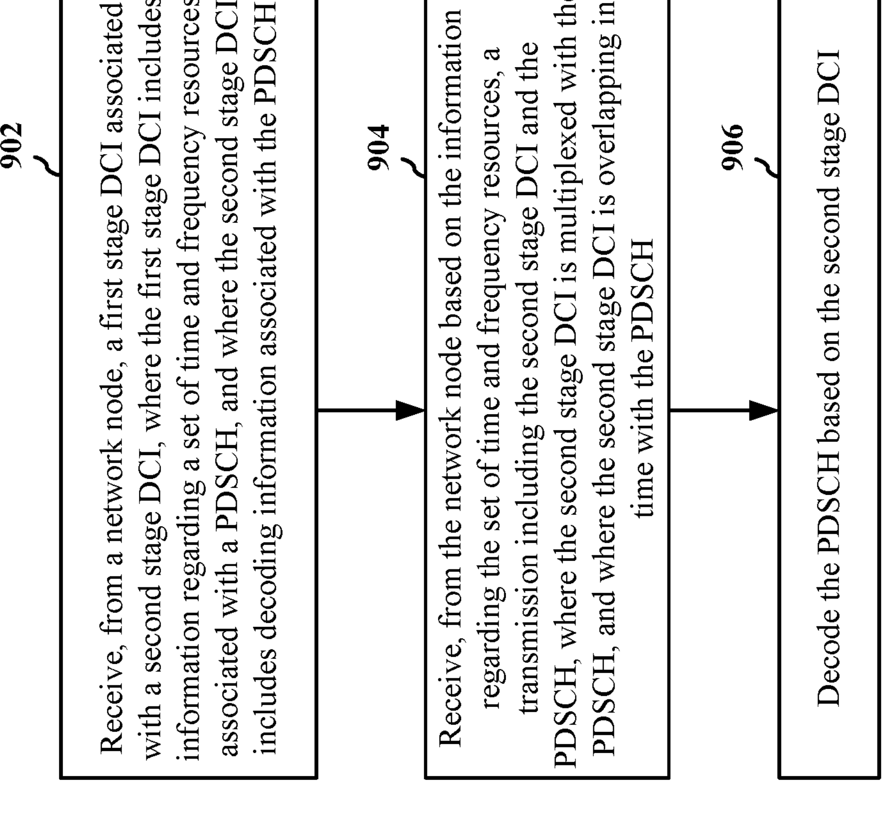
FIG. 9 is a flowchart of a method of wireless communication.

FIG. 9 is a flowchart 900 of a method of wireless communication. The method may be performed by a UE (e.g., the UE 104, the UE 802; the apparatus 1104).

At 902, the UE may receive, from a network node, a first stage DCI associated with a second stage DCI, where the first stage DCI includes information regarding a set of time and frequency resources associated with a PDSCH, and where the second stage DCI includes decoding information associated with the PDSCH. For example, the UE 802 may receive, from a network node 804, a first stage DCI 808 associated with a second stage DCI 810, where the first stage DCI includes information regarding a set of time and frequency resources associated with a PDSCH 812, and where the second stage DCI includes decoding information associated with the PDSCH 812. In some aspects, 902 may be performed by PDSCH component 198.

At 904, the UE may receive, from the network node based on the information regarding the set of time and frequency resources (e.g., included in the first stage DCI), a transmission including the second stage DCI and the PDSCH, where the second stage DCI is multiplexed with the PDSCH, and where the second stage DCI is overlapping in time with the PDSCH. For example, the UE 802 may receive, from the network node 804 based on the information regarding the set of time and frequency resources, a transmission including the second stage DCI 810 and the PDSCH 812, where the second stage DCI is multiplexed with the PDSCH, and where the second stage DCI is overlapping in time (e.g., partially overlapping in time) with the PDSCH. In some aspects, 904 may be performed by PDSCH component 198.

At 906, the UE may decode the PDSCH based on the second stage DCI. For example, the UE 802 may decode the PDSCH based on the second stage DCI at 814. In some aspects, 906 may be performed by PDSCH component 198.

Figure 10:
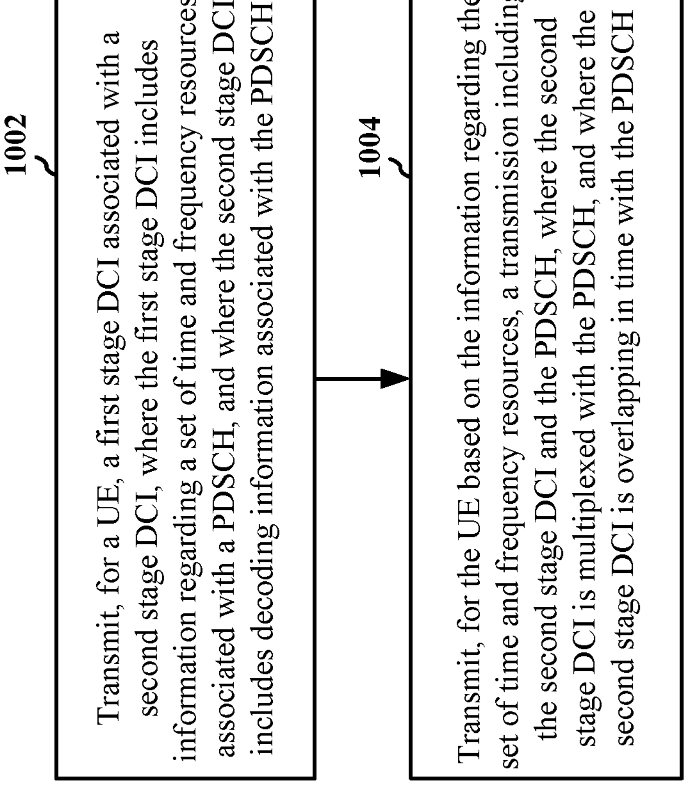
FIG. 10 is a flowchart of a method of wireless communication.

FIG. 10 is a flowchart 1000 of a method of wireless communication. The method may be performed by a network node (e.g., the base station 102, the network node 804, the network entity 1102, the network entity 1202).

At 1002, the network node may transmit, for a UE, a first stage DCI associated with a second stage DCI, where the first stage DCI includes information regarding a set of time and frequency resources associated with a PDSCH, and where the second stage DCI includes decoding information associated with the PDSCH. For example, the network node 804 may transmit, for a UE 802, a first stage DCI 808 associated with a second stage DCI 810, where the first stage DCI 808 includes information regarding a set of time and frequency resources associated with a PDSCH 812, and where the second stage DCI 810 includes decoding information associated with the PDSCH 812. In some aspects, 1002 may be performed by PDSCH component 199.

At 1004, the network node may transmit, for the UE 802 based on the information regarding the set of time and frequency resources (e.g., included in the first stage DCI), a transmission including the second stage DCI and the PDSCH, where the second stage DCI is multiplexed with the PDSCH, and where the second stage DCI is overlapping in time with the PDSCH. For example, the network node 804 may transmit, for the UE 802 based on the information regarding the set of time and frequency resources, a transmission including the second stage DCI 810 and the PDSCH 812, where the second stage DCI 810 is multiplexed with the PDSCH 812, and where the second stage DCI is overlapping in time (e.g., partially overlapping in time) with the PDSCH. In some aspects, 1004 may be performed by PDSCH component 199.

Figure 11:
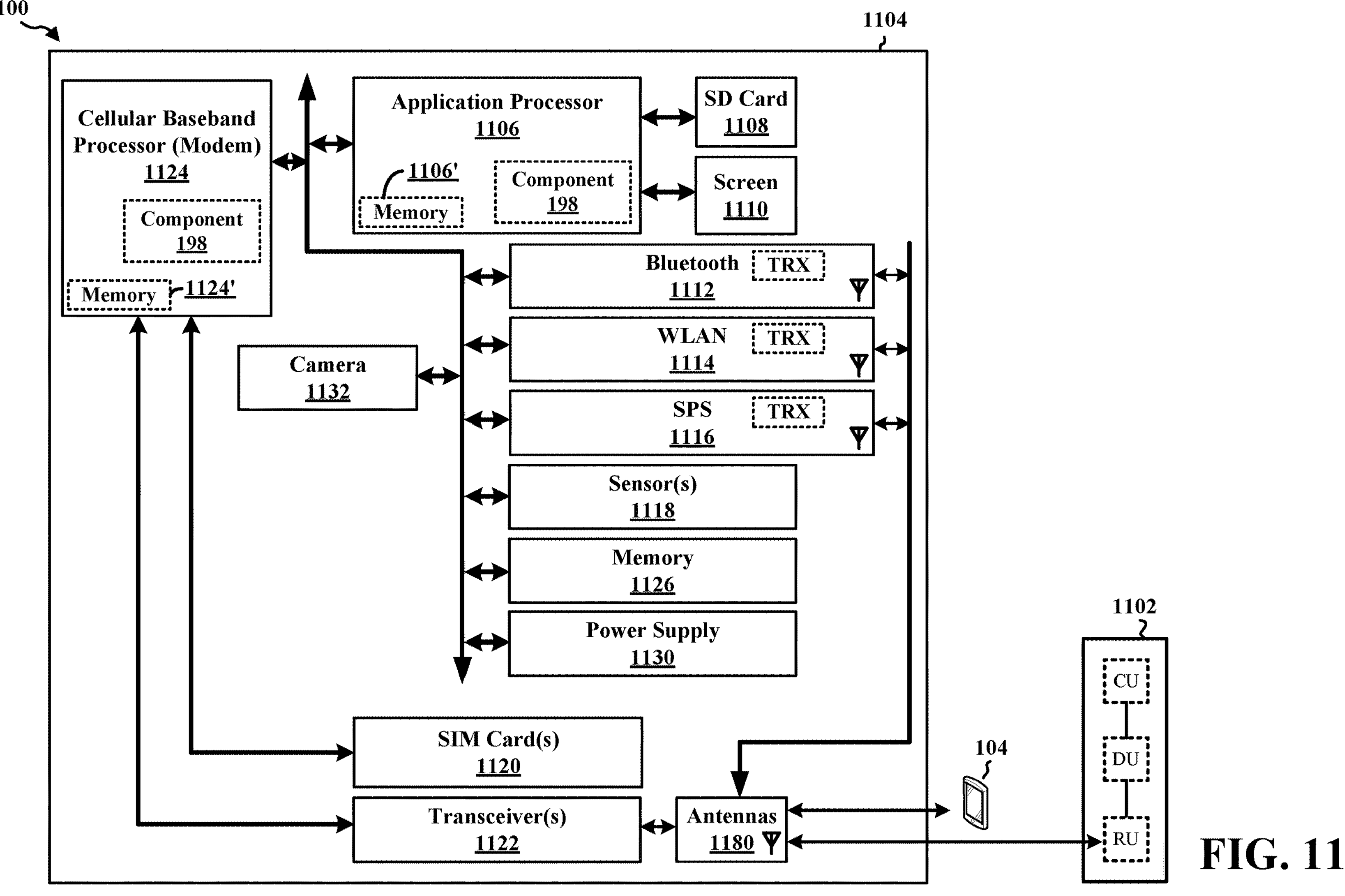
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include at least one cellular baseband processor 1124 (also referred to as a modem) coupled to one or more transceivers 1122 (e.g., cellular RF transceiver). The cellular baseband processor(s) 1124 may include at least one on-chip memory 1124'. In some aspects, the apparatus 1104 may further include one or more subscriber identity modules (SIM) cards 1120 and at least one application processor 1106 coupled to a secure digital (SD) card 1108 and a screen 1110. The application processor(s) 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor(s) 1124 communicates through the transceiver(s) 1122 via one or more antennas 1180 with the UE 104 and/or with an RU associated with a network entity 1102. The cellular baseband processor(s) 1124 and the application processor(s) 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor(s) 1124 and the application processor(s) 1106 are each responsible for general processing, including the execution of software stored on the computer-readable medium/memory. The software, when executed by the cellular baseband processor(s) 1124/application processor(s) 1106, causes the cellular baseband processor(s) 1124/application processor(s) 1106 to perform the various functions described supra. The computer-readable medium/memory may also be used for storing data that is manipulated by the cellular baseband processor(s) 1124/application processor(s) 1106 when executing software. The cellular baseband processor(s) 1124/application processor(s) 1106 may be a component of the UE 350 and may include the at least one memory 360 and/or at least one of the TX processor 368, the RX processor 356, and the controller/processor 359. In one configuration, the apparatus 1104 may be at least one processor chip (modem and/or application) and include just the cellular baseband processor(s) 1124 and/or the application processor(s) 1106, and in another configuration, the apparatus 1104 may be the entire UE (e.g., see UE 350 of FIG. 3) and include the additional modules of the apparatus 1104.

As discussed supra, the PDSCH component 198 may be configured to receive, from a network node, a first stage DCI associated with a second stage DCI, where the first stage DCI includes information regarding a set of time and frequency resources associated with a PDSCH, and where the second stage DCI includes decoding information associated with the PDSCH. In some aspects, the PDSCH component 198 may be further configured to receive, from the network node based on the information regarding the set of time and frequency resources, a transmission including the second stage DCI and the PDSCH, where the second stage DCI is multiplexed with the PDSCH, and where the second stage DCI is overlapping in time with the PDSCH. In some aspects, the PDSCH component 198 may be further configured to decode the PDSCH based on the second stage DCI. The PDSCH component 198 may be within the cellular baseband processor(s) 1124, the application processor(s) 1106, or both the cellular baseband processor(s) 1124 and the application processor(s) 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1104 may include a variety of components configured for various functions. In one configuration, the apparatus 1104, and in particular the cellular baseband processor(s) 1124 and/or the application processor(s) 1106, may include means for receiving, from a network node, a first stage DCI associated with a second stage DCI, where the first stage DCI includes information regarding a set of time and frequency resources associated with a PDSCH, and where the second stage DCI includes decoding information associated with the PDSCH. In some aspects, the apparatus 1104 may include means for receiving, from the network node based on the information regarding the set of time and frequency resources, a transmission including the second stage DCI and the PDSCH, where the second stage DCI is multiplexed with the PDSCH, and where the second stage DCI is overlapping in time with the PDSCH. In some aspects, the apparatus 1104 may include means for decoding the PDSCH based on the second stage DCI. The means may be the component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
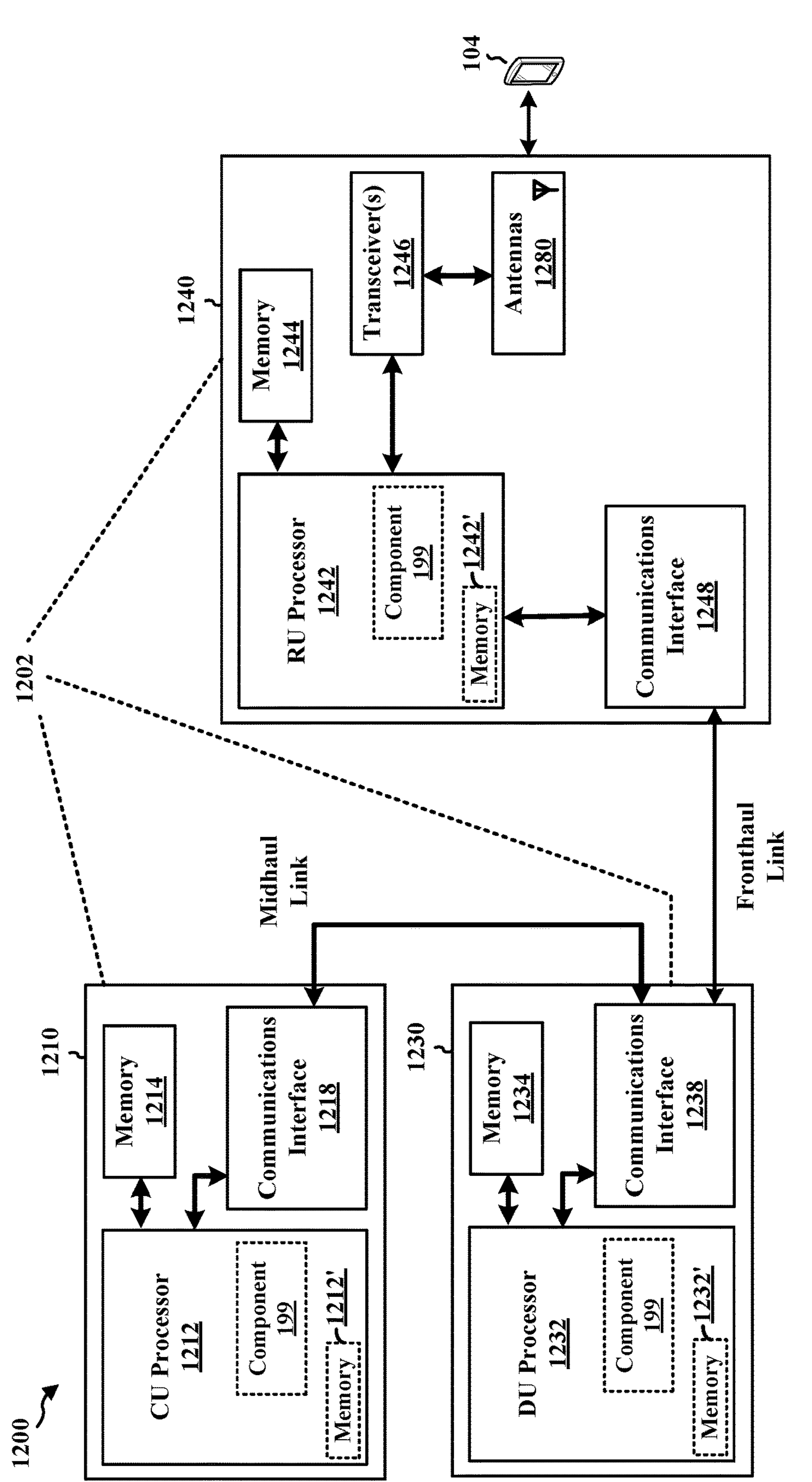
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include at least one CU processor 1212. The CU processor(s) 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include at least one DU processor 1232. The DU processor(s) 1232 may include on-chip memory 1232'. In some aspects, the DU 1230 may further include additional memory modules 1234 and a communications interface 1238. The DU 1230 communicates with the RU 1240 through a fronthaul link. The RU 1240 may include at least one RU processor 1242. The RU processor(s) 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the PDSCH component 199 may be configured to transmit, for a UE, a first stage DCI associated with a second stage DCI, where the first stage DCI includes information regarding a set of time and frequency resources associated with a PDSCH, and where the second stage DCI includes decoding information associated with the PDSCH. In some aspects, the PDSCH component 199 may be further configured to transmit, for the UE based on the information regarding the set of time and frequency resources, a transmission including the second stage DCI and the PDSCH, where the second stage DCI is multiplexed with the PDSCH, and where the second stage DCI is overlapping in time with the PDSCH. The PDSCH component 199 may be within one or more processors of one or more of the CU 1210, DU 1230, and the RU 1240. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1202 may include a variety of components configured for various functions. In one configuration, the network entity 1202 may include means for transmitting, for a UE, a first stage DCI associated with a second stage DCI, where the first stage DCI includes information regarding a set of time and frequency resources associated with a PDSCH, and where the second stage DCI includes decoding information associated with the PDSCH. In some aspects, the network entity 1202 may include means for transmitting, for the UE based on the information regarding the set of time and frequency resources, a transmission including the second stage DCI and the PDSCH, where the second stage DCI is multiplexed with the PDSCH, and where the second stage DCI is overlapping in time with the PDSCH. The means may be the component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication performed by a user equipment (UE), including: receiving, from a network node, a first stage downlink control information (DCI) associated with a second stage DCI, where the first stage DCI includes information regarding a set of time and frequency resources associated with a physical downlink shared channel (PDSCH), and where the second stage DCI includes decoding information associated with the PDSCH; receiving, from the network node based on the information regarding the set of time and frequency resources, a transmission including the second stage DCI and the PDSCH, where the second stage DCI is multiplexed with the PDSCH, and where the second stage DCI is overlapping in time with the PDSCH; and decoding the PDSCH based on the second stage DCI.

Aspect 2 is the method of aspect 1, where the second stage DCI is multiplexed with the PDSCH based on the PDSCH being rate matched around the second stage DCI.

Aspect 3 is the method of any of aspects 1-2, where the second stage DCI is associated with a search space (SS) set associated with an interleaved control channel element (CCE) to resource element group (REG) mapping, and where the second stage DCI is carried in a set of non-consecutive resources.

Aspect 4 is the method of any of aspects 1-3, where the first stage DCI overlaps with the PDSCH, and where the PDSCH is rate matched around the first stage DCI.

Aspect 5 is the method of any of aspects 1-4, where a range of frequency domain resources for the second stage DCI is based on a configuration in a control resource set (CORESET) for the second stage DCI.

Aspect 6 is the method of any of aspects 5, where the configuration in the CORESET for the second stage DCI includes a bitmap indicating a set of resource blocks (RBs) as the range of the frequency domain resources for the second stage DCI.

Aspect 7 is the method of any of aspects 1-6, where a range of frequency domain resources for the second stage DCI is based on a set of frequency domain resources for the PDSCH.

Aspect 8 is the method of any of aspects 1-7, where a set of time domain resources for the second stage DCI is based on a configuration associated with a search space (SS) set for the second stage DCI, and where the configuration indicates the set of time domain resources.

Aspect 9 is the method of any of aspects 1-8, where a first set of time domain resources for the second stage DCI is based on a second set of time domain resources for the PDSCH, and where the first set of time domain resources and the second set of time domain resources overlap in time.

Aspect 10 is the method of any of aspects 9, where the first set of time domain resources and the second set of time domain resources share a same starting symbol.

Aspect 11 is the method of any of aspects 1-10, where a monitoring occasion associated with the second stage DCI overlaps with a set of resources for the PDSCH, and where the second stage DCI is not carried in a resource that overlaps with one or more rate matching resources for the PDSCH.

Aspect 12 is the method of any of aspects 1-11, where a monitoring occasion associated with the second stage DCI overlaps with a set of resources for the PDSCH, and where one or more rate matching resources for the PDSCH are removed for the second stage DCI.

Aspect 13 is the method of any of aspects 1-12, further including at least one of a transceiver or an antenna coupled to the at least one processor, where to receive the first stage DCI, the at least one processor, individually or in combination, is configured to receive the first stage DCI via at least one of the transceiver or the antenna, and where the second stage DCI is carried in a first physical downlink control channel (PDCCH) candidate resource in a set of PDCCH candidate resources available for the second stage DCI.

Aspect 14 is a method of wireless communication performed by a network node, including: transmitting, for a user equipment (UE), a first stage downlink control information (DCI) associated with a second stage DCI, where the first stage DCI includes information regarding a set of time and frequency resources associated with a physical downlink shared channel (PDSCH), and where the second stage DCI includes decoding information associated with the PDSCH; and transmitting, for the UE based on the information regarding the set of time and frequency resources, a transmission including the second stage DCI and the PDSCH, where the second stage DCI is multiplexed with the PDSCH, and where the second stage DCI is overlapping in time with the PDSCH.

Aspect 15 is the method of aspect 14, where the second stage DCI is multiplexed with the PDSCH based on the PDSCH being rate matched around the second stage DCI.

Aspect 16 is the method of aspect 15, where the second stage DCI is associated with a search space (SS) set associated with an interleaved control channel element (CCE) to resource element group (REG) mapping, and where the second stage DCI is carried in a set of non-consecutive resources.

Aspect 17 is the method of any of aspects 15-16, where the first stage DCI overlaps with the PDSCH, and where the PDSCH is rate matched around the first stage DCI.

Aspect 18 is the method of any of aspects 14-17, where a range of frequency domain resources for the second stage DCI is based on a configuration in a control resource set (CORESET) for the second stage DCI.

Aspect 19 is the method of aspect 18, where the configuration in the CORESET for the second stage DCI includes a bitmap indicating a set of resource blocks (RBs) as the range of the frequency domain resources for the second stage DCI.

Aspect 20 is the method of any of aspects 14-19, where a range of frequency domain resources for the second stage DCI is based on a set of frequency domain resources for the PDSCH.

Aspect 21 is the method of any of aspects 14-22, where a set of time domain resources for the second stage DCI is based on a configuration associated with a search space (SS) set for the second stage DCI, and where the configuration indicates the set of time domain resources.

Aspect 22 is the method of any of aspects 14-21, where a first set of time domain resources for the second stage DCI is based on a second set of time domain resources for the PDSCH, and where the first set of time domain resources and the second set of time domain resources overlap in time.

Aspect 23 is the method of any of aspects 22, where the first set of time domain resources and the second set of time domain resources share a same starting symbol.

Aspect 24 is the method of any of aspects 14-23, where a monitoring occasion associated with the second stage DCI overlaps with a set of resources for the PDSCH, and where the second stage DCI is not carried in a resource that overlaps with one or more rate matching resources for the PDSCH.

Aspect 25 is the method of any of aspects 14-25, where a monitoring occasion associated with the second stage DCI overlaps with a set of resources for the PDSCH, and where one or more rate matching resources for the PDSCH are removed for the second stage DCI.

Aspect 26 is the method of any of aspects 14-25, further including at least one of a transceiver or an antenna coupled to the at least one processor, where to transmit the first stage DCI, the at least one processor, individually or in combination, is configured to transmit the first stage DCI via at least one of the transceiver or the antenna, and where the second stage DCI is carried in a first physical downlink control channel (PDCCH) candidate resource in a set of PDCCH candidate resources available for the second stage DCI.

Aspect 27 is an apparatus for wireless communication at a UE including at least one memory and at least one processor coupled to the at least one memory and, based at least in part on information stored in the at least one memory, the at least one processor is configured, individually or in combination, to implement any of aspects 1 to 13.

Aspect 28 is the apparatus of aspect 27, further including one or more transceivers or one or more antennas coupled to the at least one processor.

Aspect 29 is an apparatus for wireless communication at a UE including means for implementing any of aspects 1 to 13.

Aspect 30 is a computer-readable medium (e.g., a non-transitory computer-readable medium) storing computer executable code, where the code when executed by at least one processor causes the at least one processor to implement any of aspects 1 to 13.

Aspect 31 is an apparatus for wireless communication at a network node including at least one memory and at least one processor coupled to the at least one memory and, based at least in part on information stored in the at least one memory, the at least one processor is configured, individually or in combination, to implement any of aspects 14 to 26.

Aspect 32 is the apparatus of aspect 31, further including one or more transceivers or one or more antennas coupled to the at least one processor.

Aspect 33 is an apparatus for wireless communication at a network node including means for implementing any of aspects 14 to 26.

Aspect 34 is a computer-readable medium (e.g., a non-transitory computer-readable medium) storing computer executable code, where the code when executed by at least one processor causes the at least one processor to implement any of aspects 14 to 26.

What is claimed is:

1. An apparatus for wireless communication at a user equipment (UE), comprising:

at least one memory; and at least one processor coupled to the at least one memory and, based at least in part on information stored in the at least one memory, the at least one processor, individually or in any combination, is configured to cause the UE to:

receive, from a network node, a first stage downlink control information (DCI) associated with a second stage DCI, wherein the first stage DCI comprises information regarding a set of time and frequency resources associated with a physical downlink shared channel (PDSCH), and wherein the second stage DCI includes decoding information associated with the PDSCH;

receive, from the network node based on the information regarding the set of time and frequency resources, a transmission including the second stage DCI and the PDSCH, wherein the second stage DCI is multiplexed with the PDSCH, and wherein the second stage DCI is overlapping in time with the PDSCH; and decode the PDSCH based on the second stage DCI.

2. The apparatus of claim 1, wherein the second stage DCI is multiplexed with the PDSCH based on the PDSCH being rate matched around the second stage DCI.

3. The apparatus of claim 2, wherein the second stage DCI is associated with a search space (SS) set associated with an interleaved control channel element (CCE) to resource element group (REG) mapping, and wherein the second stage DCI is carried in a set of non-consecutive resources.

4. The apparatus of claim 2, wherein the first stage DCI overlaps with the PDSCH, and wherein the PDSCH is rate matched around the first stage DCI.

5. The apparatus of claim 1, wherein a range of frequency domain resources for the second stage DCI is based on a configuration in a control resource set (CORESET) for the second stage DCI.

6. The apparatus of claim 5, wherein the configuration in the CORESET for the second stage DCI comprises a bitmap indicating a set of resource blocks (RBs) as the range of the frequency domain resources for the second stage DCI.

7. The apparatus of claim 1, wherein a range of frequency domain resources for the second stage DCI is based on a set of frequency domain resources for the PDSCH.

8. The apparatus of claim 1, wherein a set of time domain resources for the second stage DCI is based on a configuration associated with a search space (SS) set for the second stage DCI, and wherein the configuration indicates the set of time domain resources.

9. The apparatus of claim 1, wherein a first set of time domain resources for the second stage DCI is based on a second set of time domain resources for the PDSCH, and wherein the first set of time domain resources and the second set of time domain resources overlap in time.

10. The apparatus of claim 9, wherein the first set of time domain resources and the second set of time domain resources share a same starting symbol.

11. The apparatus of claim 1, wherein a monitoring occasion associated with the second stage DCI overlaps with a set of resources for the PDSCH, and wherein the second stage DCI is not carried in a resource that overlaps with one or more rate matching resources for the PDSCH.

12. The apparatus of claim 1, wherein a monitoring occasion associated with the second stage DCI overlaps with a set of resources for the PDSCH, and wherein one or more rate matching resources for the PDSCH are removed for the second stage DCI.

13. The apparatus of claim 1, further comprising at least one of a transceiver or an antenna coupled to the at least one processor, wherein to receive the first stage DCI, the at least one processor, individually or in combination, is configured to receive the first stage DCI via at least one of the transceiver or the antenna, and wherein the second stage DCI is carried in a first physical downlink control channel (PDCCH) candidate resource in a set of PDCCH candidate resources available for the second stage DCI.

14. An apparatus for wireless communication at a network node, comprising:

at least one memory; and at least one processor coupled to the at least one memory and, based at least in part on information stored in the at least one memory, the at least one processor, individually or in any combination, is configured to cause the network node to:

transmit, for a user equipment (UE), a first stage downlink control information (DCI) associated with a second stage DCI, wherein the first stage DCI comprises information regarding a set of time and frequency resources associated with a physical downlink shared channel (PDSCH), and wherein the second stage DCI includes decoding information associated with the PDSCH; and transmit, for the UE based on the information regarding the set of time and frequency resources, a transmission including the second stage DCI and the PDSCH, wherein the second stage DCI is multiplexed with the PDSCH, and wherein the second stage DCI is overlapping in time with the PDSCH.

15. The apparatus of claim 14, wherein the second stage DCI is multiplexed with the PDSCH based on the PDSCH being rate matched around the second stage DCI.

16. The apparatus of claim 15, wherein the second stage DCI is associated with a search space (SS) set associated with an interleaved control channel element (CCE) to resource element group (REG) mapping, and wherein the second stage DCI is carried in a set of non-consecutive resources.

17. The apparatus of claim 15, wherein the first stage DCI overlaps with the PDSCH, and wherein the PDSCH is rate matched around the first stage DCI.

18. The apparatus of claim 14, wherein a range of frequency domain resources for the second stage DCI is based on a configuration in a control resource set (CORESET) for the second stage DCI.

19. The apparatus of claim 18, wherein the configuration in the CORESET for the second stage DCI comprises a bitmap indicating a set of resource blocks (RBs) as the range of the frequency domain resources for the second stage DCI.

20. The apparatus of claim 14, wherein a range of frequency domain resources for the second stage DCI is based on a set of frequency domain resources for the PDSCH.

21. The apparatus of claim 14, wherein a set of time domain resources for the second stage DCI is based on a configuration associated with a search space (SS) set for the second stage DCI, and wherein the configuration indicates the set of time domain resources.

22. The apparatus of claim 14, wherein a first set of time domain resources for the second stage DCI is based on a second set of time domain resources for the PDSCH, and wherein the first set of time domain resources and the second set of time domain resources overlap in time.

23. The apparatus of claim 22, wherein the first set of time domain resources and the second set of time domain resources share a same starting symbol.

24. The apparatus of claim 14, wherein a monitoring occasion associated with the second stage DCI overlaps with a set of resources for the PDSCH, and wherein the second stage DCI is not carried in a resource that overlaps with one or more rate matching resources for the PDSCH.

25. The apparatus of claim 14, wherein a monitoring occasion associated with the second stage DCI overlaps with a set of resources for the PDSCH, and wherein one or more rate matching resources for the PDSCH are removed for the second stage DCI.

26. The apparatus of claim 14, further comprising at least one of a transceiver or an antenna coupled to the at least one processor, wherein to transmit the first stage DCI, the at least one processor, individually or in combination, is configured to transmit the first stage DCI via at least one of the transceiver or the antenna, and wherein the second stage DCI is carried in a first physical downlink control channel (PDCCH) candidate resource in a set of PDCCH candidate resources available for the second stage DCI.

27. A method of wireless communication performed by a user equipment (UE), comprising:

receiving, from a network node, a first stage downlink control information (DCI) associated with a second stage DCI, wherein the first stage DCI comprises information regarding a set of time and frequency resources associated with a physical downlink shared channel (PDSCH), and wherein the second stage DCI includes decoding information associated with the PDSCH;

receiving, from the network node based on the information regarding the set of time and frequency resources, a transmission including the second stage DCI and the PDSCH, wherein the second stage DCI is multiplexed with the PDSCH, and wherein the second stage DCI is overlapping in time with the PDSCH; and decoding the PDSCH based on the second stage DCI.

28. The method of claim 27, wherein the second stage DCI is multiplexed with the PDSCH based on the PDSCH being rate matched around the second stage DCI.

29. The method of claim 28, wherein the second stage DCI is associated with a search space (SS) set associated with an interleaved control channel element (CCE) to resource element group (REG) mapping, and wherein the second stage DCI is carried in a set of non-consecutive resources.

30. A method of wireless communication performed by a network node, comprising:

transmitting, for a user equipment (UE), a first stage downlink control information (DCI) associated with a second stage DCI, wherein the first stage DCI comprises information regarding a set of time and frequency resources associated with a physical downlink shared channel (PDSCH), and wherein the second stage DCI includes decoding information associated with the PDSCH; and transmitting, for the UE based on the information regarding the set of time and frequency resources, a transmission including the second stage DCI and the PDSCH, wherein the second stage DCI is multiplexed with the PDSCH, and wherein the second stage DCI is overlapping in time with the PDSCH.

* * * * *